(12) United States Patent
Lieh

(10) Patent No.: US 11,708,127 B2
(45) Date of Patent: Jul. 25, 2023

(54) WALKING VEHICLE THAT IS EASY TO SWING AND STEER

(71) Applicant: Junghsen Lieh, Beavercreek, OH (US)

(72) Inventor: Junghsen Lieh, Beavercreek, OH (US)

( * ) Notice: Subject to any disclaimer, the term of this patent is extended or adjusted under 35 U.S.C. 154(b) by 216 days.

(21) Appl. No.: 17/377,454

(22) Filed: Jul. 16, 2021

(65) Prior Publication Data

US 2023/0018220 A1 Jan. 19, 2023

(51) Int. Cl.
*B62M 3/06* (2006.01)
*B62K 5/05* (2013.01)
*B62K 5/08* (2006.01)

(52) U.S. Cl.
CPC ............. *B62M 3/06* (2013.01); *B62K 5/05* (2013.01); *B62K 5/08* (2013.01)

(58) Field of Classification Search
CPC .. B62M 3/06; B62M 1/12; B62K 5/05; B62K 5/08; B62K 5/10; B62K 21/00; B62K 21/12
See application file for complete search history.

(56) References Cited

U.S. PATENT DOCUMENTS

| | | | |
|---|---|---|---|
| 2017/0259875 A1* | 9/2017 | Chang | B62K 25/16 |
| 2019/0084638 A1* | 3/2019 | Melcher | B62L 1/005 |
| 2020/0346707 A1* | 11/2020 | Choi | B62D 9/02 |
| 2022/0204120 A1* | 6/2022 | Praveen | B62K 21/04 |

* cited by examiner

*Primary Examiner* — Kevin Hurley
*Assistant Examiner* — Marlon A Arce
(74) *Attorney, Agent, or Firm* — Birch, Stewart, Kolasch & Birch, LLP

(57) ABSTRACT

A walking vehicle the vehicle frame comprises a vertical tube adjacent to the two front wheels, and a lateral tube at the top end of the vertical tube. The rear wheel is connected to a left pedal and a right pedal. The central rod passes through the lateral tube. The left handlebar sheathes and the right handlebar sheathes each one end of the central rod. The left handlebar are connected to the left pedal. The right handlebar are connected to the right pedal. The gear set comprises a first bevel gear mounted at the right handlebar, a second bevel gear mounted at the right connecting rod, and a connecting gear with a mounting rod passing through the central rod thereof and engaging the first bevel gear and the second bevel gear. This has the effect of facilitating the operation of the walking vehicle for improved handling maneuverability and stability.

6 Claims, 15 Drawing Sheets

WALKING VEHICLE THAT IS EASY TO SWING AND STEER

BACKGROUND OF THE INVENTION

1. Field of the Invention

The present invention relates to walking vehicle structures and more particularly, to a walking vehicle that is easy to swing and steer, and that can switch between synchronous operation and non-synchronous operation of both hands.

2. Description of the Related Art

A conventional walking vehicle structure, as shown in FIG. 17, comprises: a vehicle frame 50, a steering mechanism 60, and a handlebar set 70. The vehicle frame 50 is pivotally provided with a rear wheel 51, and the rear wheel 51 is connected to a right pedal 53 and a left pedal 54 through a chainwheel mechanism 52. The steering mechanism 60 consists of two swing arms 62 and two control rods 63, and they are connected to the two front wheels 61. The vehicle frame 50 extends to a vertical tube 55, and the top end of the vertical tube 55 is assembled with a lateral tube 56. The vertical tube 55 is connected to the two swing arms 62 and the two control rods 63 at the bottom end, so that the vehicle frame 50 can tilt with the center of the swing arms 62 as a pivot, and push the two control rods 63 to control the steering of the front wheels 61. At the top end of the handlebar set 70, a right handlebar 71 and a left handlebar 72 are swinging about the axis of the lateral tube 56, and the other end is connected to the right pedal 53 and left pedal 54, which allows the user's left hand and right hand be able to swing with both feet asynchronously, so as to achieve the riding purpose of the walking mode. However, it is not difficult to find out that there are still some shortcomings in the above-mentioned prior art design. The main reason is as follows: when the left and right hands alternately (non-synchronized) push forward and pull backward, it will be difficult for the user to control the right handlebar 71, the left handlebar 72, and the center of gravity of the rider tilts to the side of the handlebar set 70, resulting in unbalanced and unsmooth shortcomings when operating the walking vehicle in a turning mode. When the vehicle speed is too fast, there is a risk of steering overturning.

SUMMARY OF THE INVENTION

The present invention has been accomplished under the circumstances in view of prior art. It is the main object of the present invention to provide a walking vehicle that is easy to swing and steer.

To achieve this and other objects of the present invention, a walking vehicle comprises a vehicle frame, a handlebar set and a gear set. The vehicle frame provided with two front wheels and one rear wheel. The rear wheel is connected to a left pedal and a right pedal. The vehicle frame comprises a vertical tube adjacent to the two front wheels, and a lateral tube at the top end of the vertical tube. The handlebar set comprises a central rod, a left handlebar, a right handlebar, a left connecting rod, and a right connecting rod. The central rod passes through the lateral tube. The left handlebar sheathes one end of the central rod. The right handlebar sheathes the other end of the central rod. The left handlebar and the left pedal are connected to the left connecting rod. The right handlebar and the right pedal are connected to the right connecting rod. The gear set comprises a first bevel gear mounted at the right handlebar, a second bevel gear mounted at the right connecting rod, and a connecting gear with a mounting rod passing through the central rod thereof and engaging the first bevel gear and the second bevel gear.

Preferably, the gear set further comprises a gear box fixed to the mounting rod to enclose the first bevel gear, the second bevel gear and the connecting gear, and a positioning screw provided on the gear box, the positioning screw is locked and pressed down on the connecting gear, so that the central rod, the connecting gear, the first bevel gear and the second bevel gear form an overall interlocking piece.

Preferably, the central rod is provided with a threaded hole at the end of the right handlebar. The threaded hole is locked with a lock screw. The lock screw is constrained on the outside of the right handlebar.

Preferably, the vehicle frame further comprises a first rod coaxially extended at a bottom end of the vertical tube and used to control the front wheels for steering, a round rod extending perpendicular to the first rod, and a second rod coaxially connected with the round rod and used to hold two front wheels.

Preferably, the second rod comprises a flange. The round rod comprises a threaded portion. The vehicle frame further comprises a sleeve sheathing on the second rod and constrained by the flange to prevent the sleeve detaching from the second rod. The sleeve is threaded onto the threaded portion of the round rod so that the round rod can rotate relatively to the second rod.

Preferably, the walking vehicle further comprises a steering mechanism. The steering mechanism comprises a coupler, a T-arm, an inner fixed rod and two steer arms. The coupler has a middle joint connected to the first rod, and two opposite ends each provided with a moving pivot. The middle joint of the T-arm connects to the second rod, and its tube severs as a sleeve for the inner fixed rod. The inner fixed rod and the coupler are parallel to each other. The two steer arms each has one end connects to one front wheel, and the other end connected to one moving pivot. The inner fixed rod has two opposite ends with each connecting to respective middle section of the steer arm by a fixed pivot.

Thus, the present invention uses a gear set to change the swing direction of the right handlebar, so that regardless of the alternating movement of the left pedal or the right pedal, the left handlebar and the right handlebar will both push forward and pull back synchronously, which can produce a fitness effect like rowing a boat. When the left and right hands simultaneously push forward and pull backward, the rider will more easily control the left handlebar, the right handlebar, and the center of gravity of the body tilt to the side of the vehicle frame, thereby facilitating the operation of the walking vehicle thus to improve handling maneuverability and stability.

DETAILED DESCRIPTION OF THE INVENTION

Figure 1:
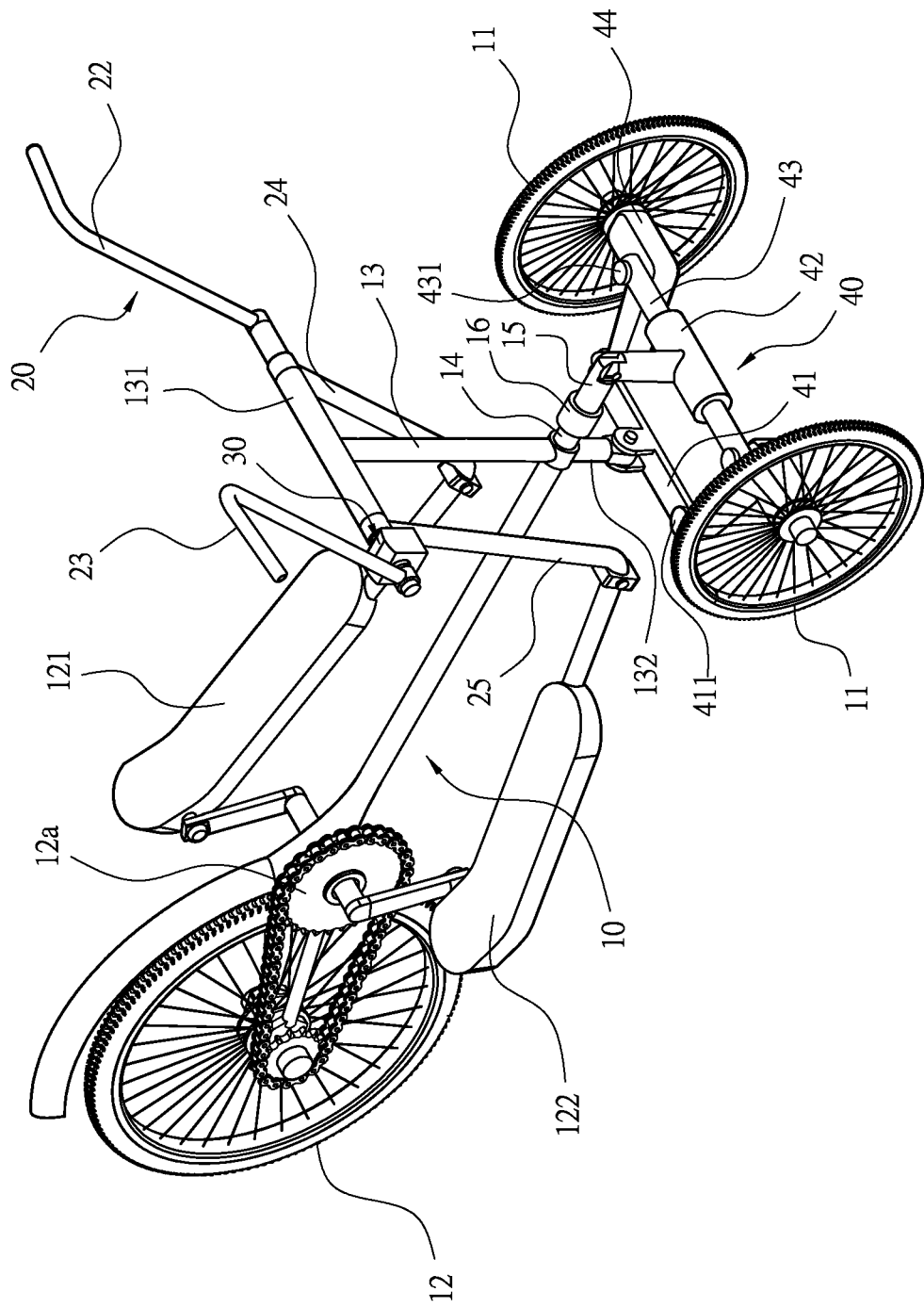
FIG. 1 is an elevational view of a walking vehicle of the present invention.
Figure 2:
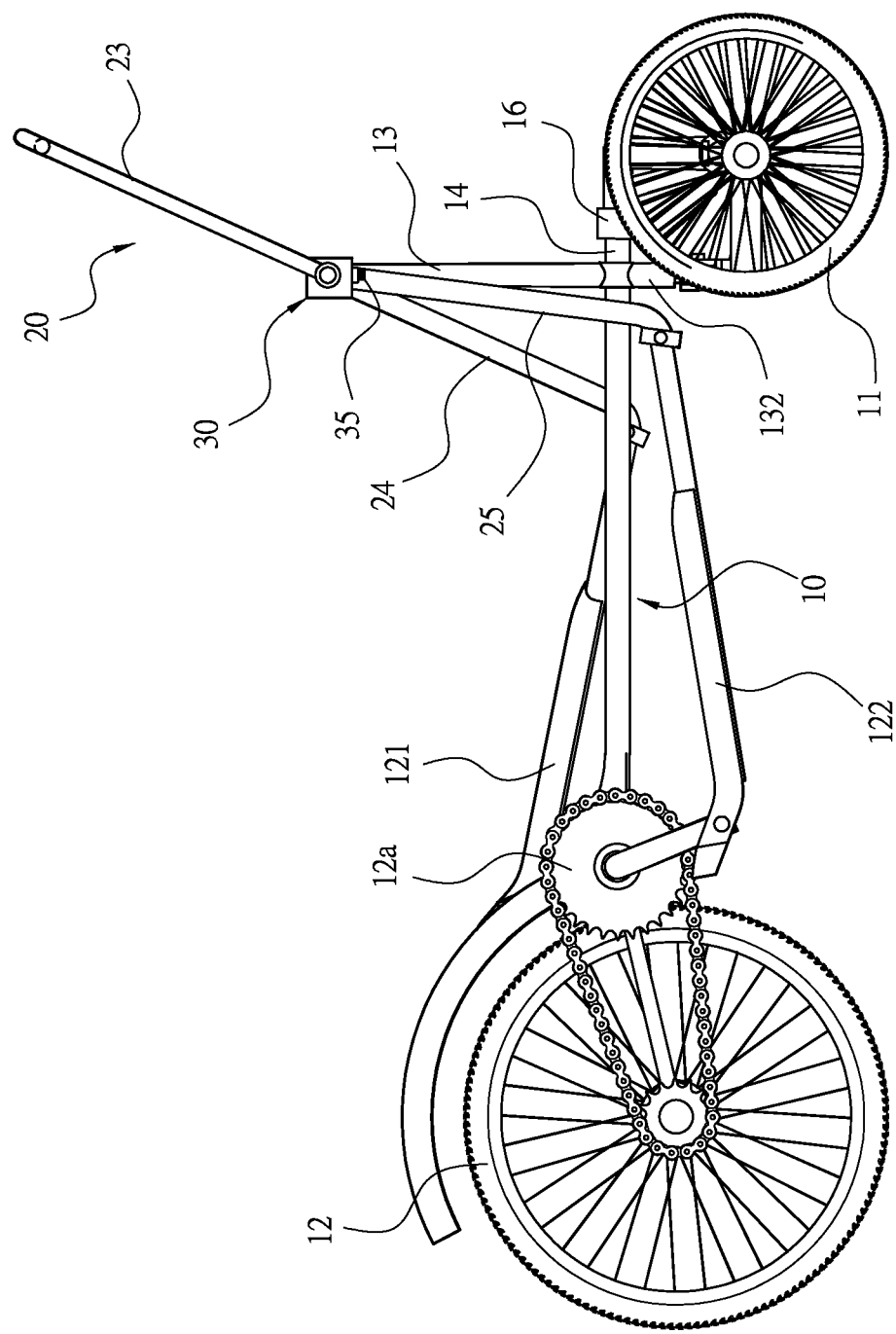
FIG. 2 is a side view of the present invention, showing the left handlebar and the right handlebar in a synchronized position.
Figure 3:
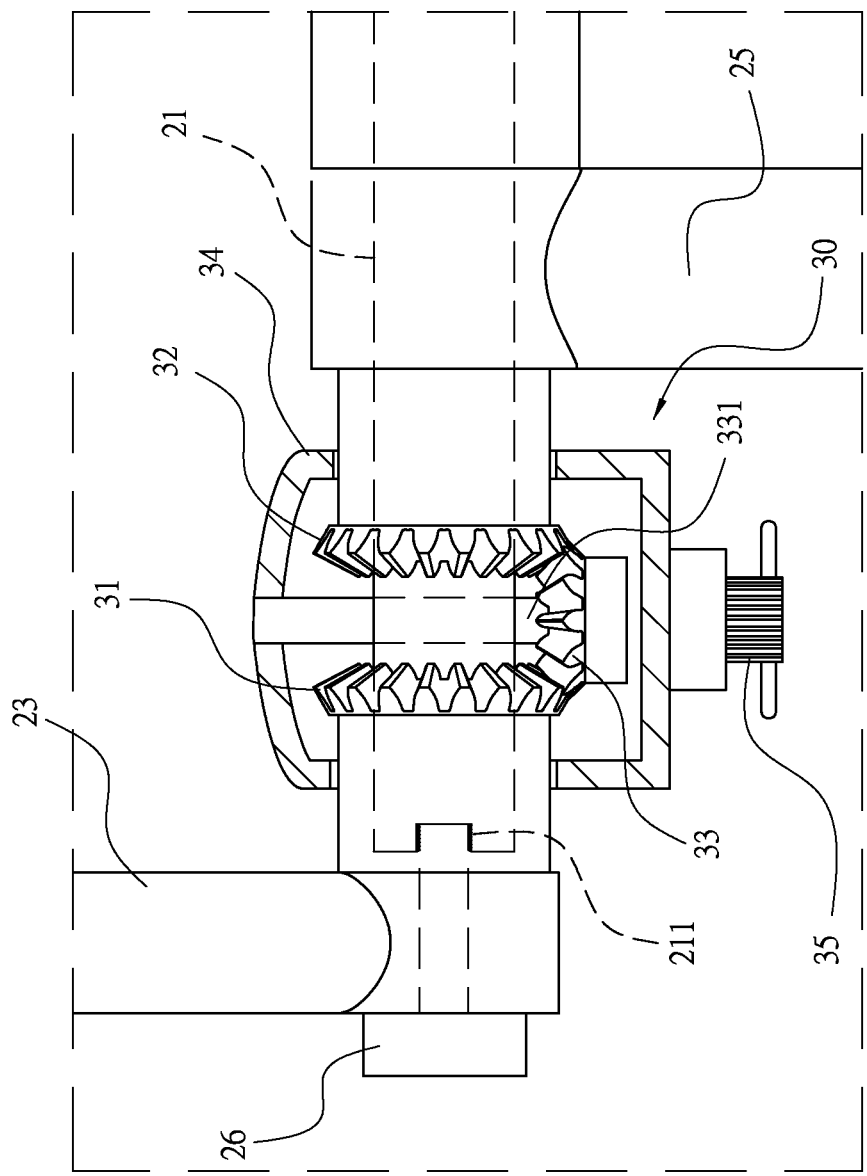
FIG. 3 is a partial sectional view of the gear set.

Referring to FIGS. 1-3, a walking vehicle that is easy to swing and steer comprises a vehicle frame 10, a handlebar set 20, a gear set 30, and a steering mechanism 40. The vehicle frame 10 is provided with at least one, for example, two front wheels 11, and a rear wheel 12. The rear wheel 12 is connected to a left pedal 121 and a right pedal 122 through a chainwheel mechanism 12a.

The vehicle frame 10 comprises a vertical tube 13 adjacent to the front wheels 11, a lateral tube 131 at the top end of the vertical tube 13, a first rod 132 coaxially extended at the bottom end of the vertical tube 13 and used to control the two front wheels 11 for steering, a round rod 14 extending perpendicular to the first rod 132 and providing a threaded portion 141, a second rod 15 coaxially connected with the round rod 14 and used to hold the two front wheels 11 and providing a flange 151, and a sleeve 16 sheathing on the second rod 15 and constrained by the flange 151 to prevent the sleeve 16 detaching from the second rod 15. The sleeve 16 is threaded onto the threaded portion 141 of the round rod 14 so that the round rod 14 can rotate relatively to the second rod 15.

The handlebar set 20 comprises a central rod 21, a left handlebar 22, a right handlebar 23, a left connecting rod 24, and a right connecting rod 25. The central rod 21 passes through the lateral tube 131, and the left handlebar 22 sheathes one end of the central rod 21, and the right handlebar 23 sheathes the other end of the central rod 21. The left handlebar 22 and the left pedal 121 are connected to the left connecting rod 24, and the right handlebar 23 and the right pedal 122 are connected to the right connecting rod 25.

The gear set 30 comprises a first bevel gear 31 mounted at the right handlebar 23, a second bevel gear 32 mounted at the right connecting rod 25, a connecting gear 33 with a mounting rod 331 passing through the central rod 21 thereof and engaging the first bevel gear 31 and the second bevel gear 32, a gear box 34 fixed to the mounting rod 331 to enclose the first bevel gear 31, the second bevel gear 32 and the connecting gear 33, and a positioning screw 35 provided on the gear box 34.

The steering mechanism 40 comprises a coupler 41, a T-arm 42, an inner fixed rod 43, and two steer arms 44. The coupler 41 has a middle joint connected to the first rod 132 and two opposite ends each provided with a moving pivot 411, respectively. The middle joint of the T-arm 42 connects to the second rod 15, and its tube severs as a sleeve for the inner fixed rod 43. The inner fixed rod 43 and the coupler 41 are parallel to each other. The two steer arms 44 each has one end connects to one front wheel 11 and the opposite end connects to one moving pivot 411. The inner fixed rod 43 has two opposite ends with each connecting to the respective middle section of the steer arm 44 by a fixed pivot 431.

Figure 4:
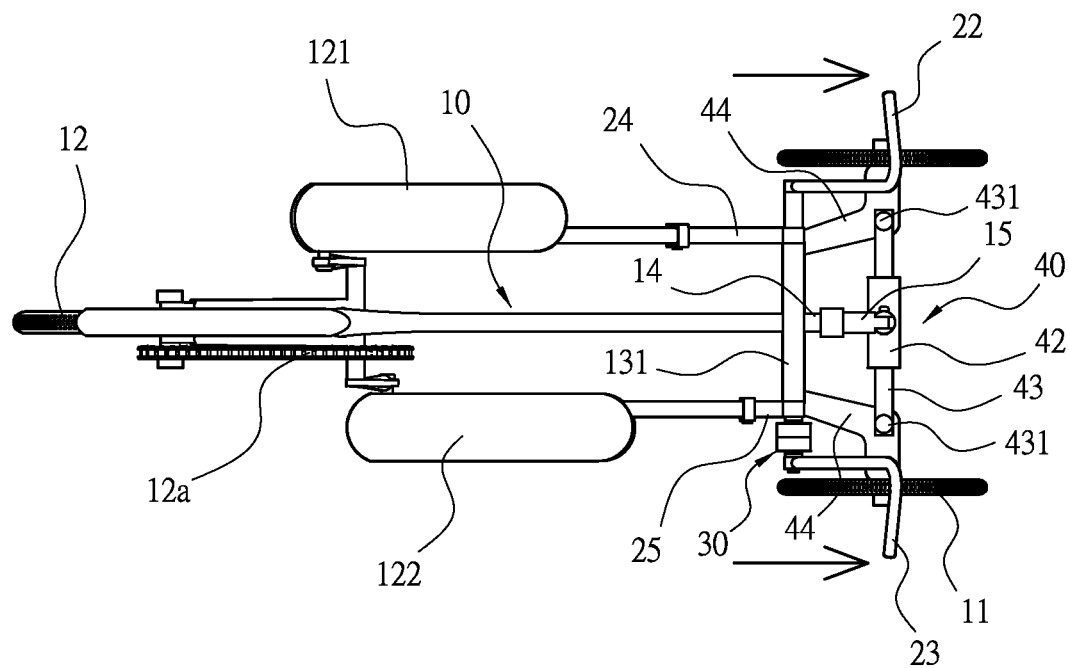
FIG. 4 is a schematic drawing of the synchronization operation of the left and right handlebars of the present invention (I).
Figure 5:
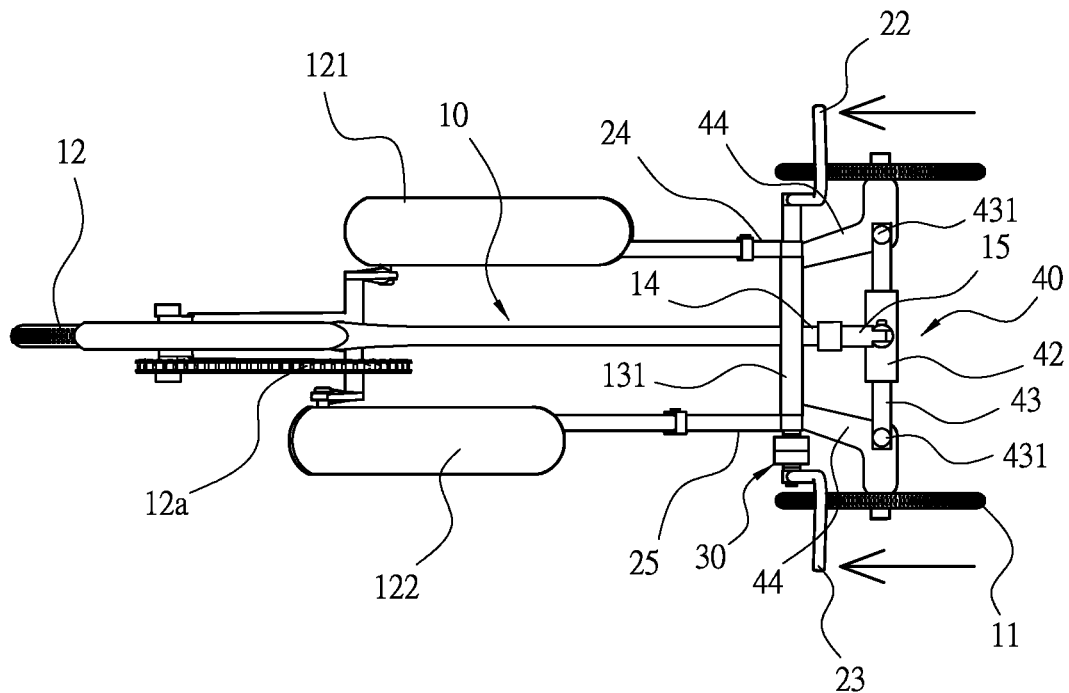
FIG. 5 is a schematic drawing of the synchronization operation of the left and right handlebars of the present invention (II).
Figure 6:
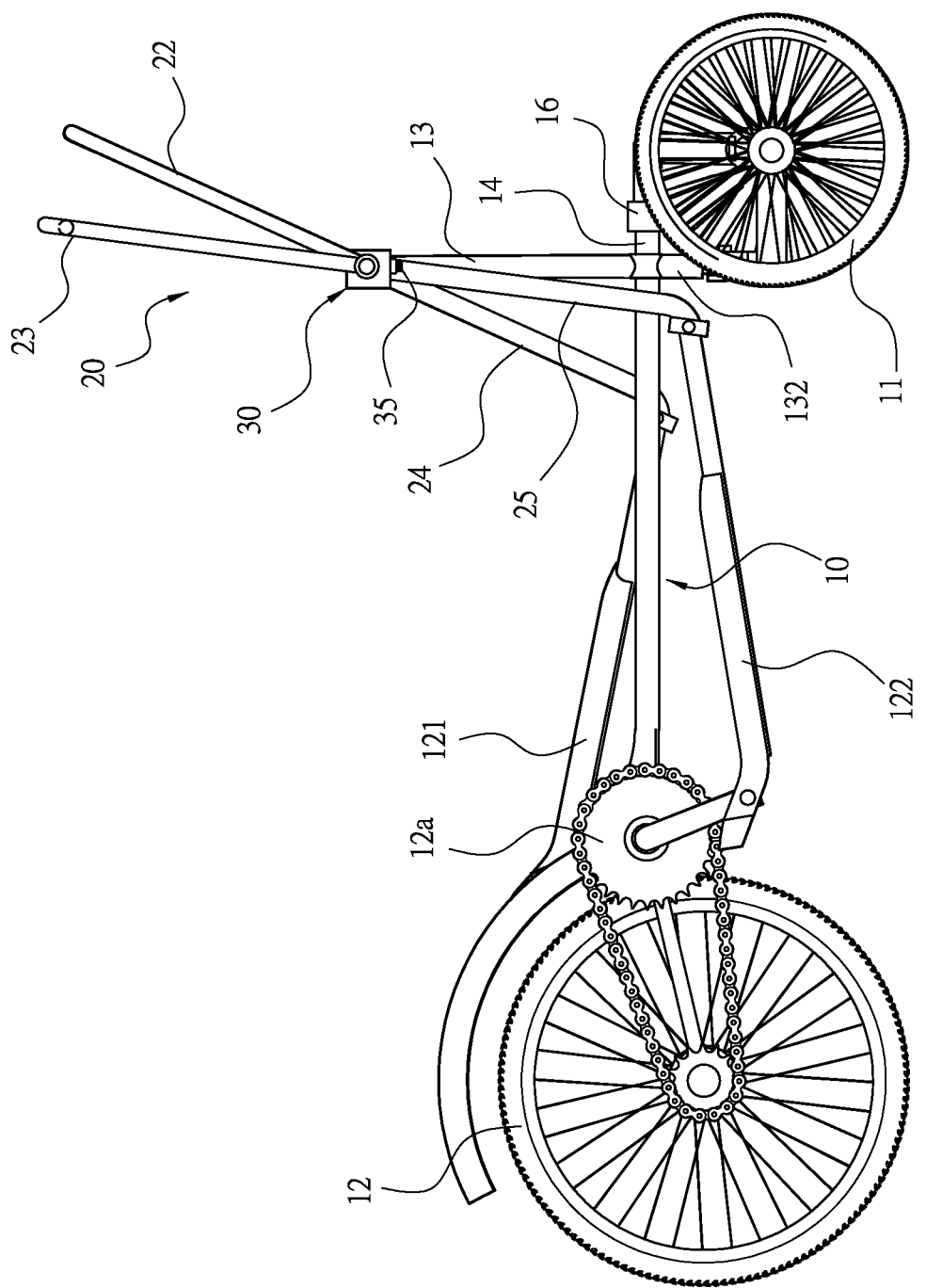
FIG. 6 is a side view of the present invention, showing the left handlebar and the right handlebar in an asynchronous position.
Figure 7:
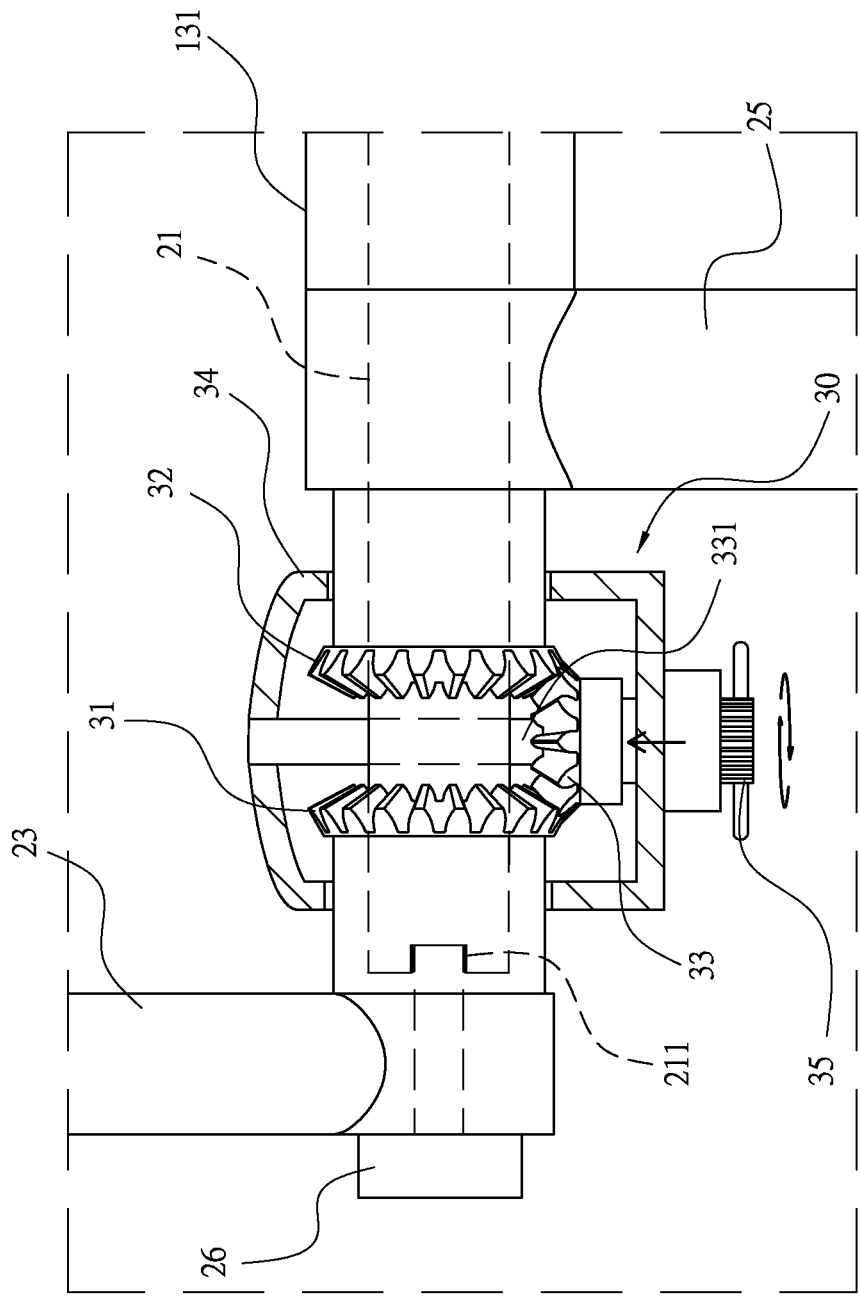
FIG. 7 is a schematic drawing of the locking action of the gear set of the present invention.
Figure 8:
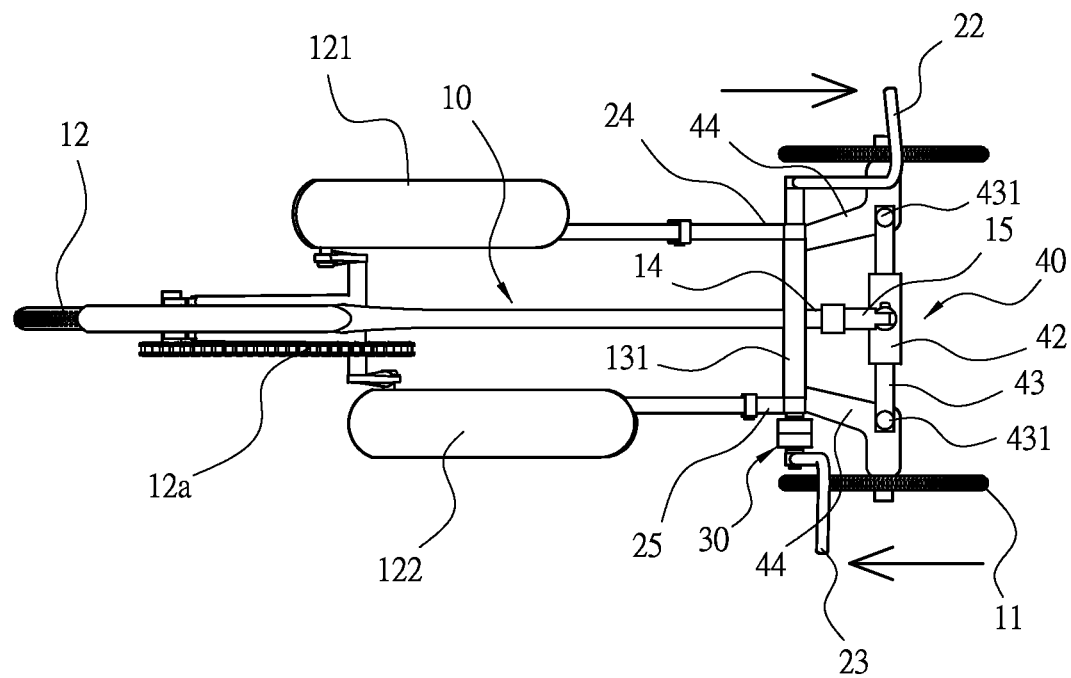
FIG. 8 is a schematic drawing of the asynchronous operation of the left and right handlebars of the present invention (I).
Figure 9:
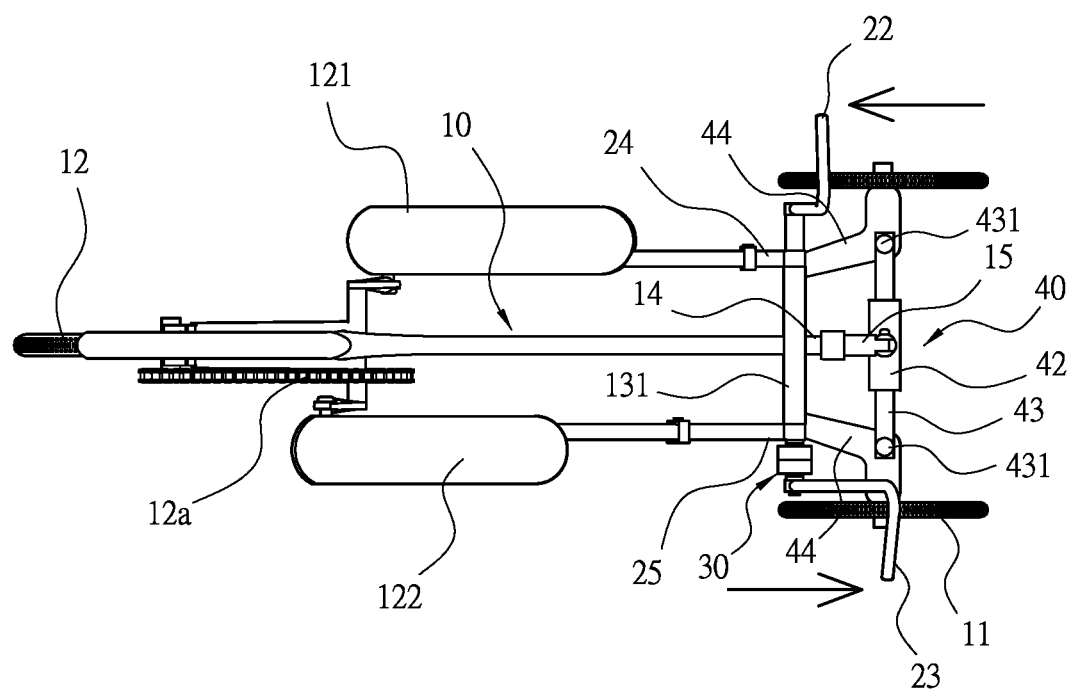
FIG. 9 is a schematic drawing of the asynchronous operation of the left and right handlebars of the present invention (II).

In actual use, please refer to FIGS. 3-5 to match FIG. 1. The rider steps on the left pedal 121 and the right pedal 122 in a standing manner with both feet, and both hands hold on the left handlebar 22 and the right handlebar 23, respectively. When both feet step on the left pedal 121 and the right pedal 122 in sequence, the left pedal 121 and the right pedal 122 drive the chainwheel mechanism 12a, and the rear wheel 12 is driven to rotate in the forward direction by the chainwheel mechanism 12a. At the same time, the left pedal 121 links the left connecting rod 24, and the left connecting rod 24 swings the left handlebar 22 synchronously, so that the left connecting rod 24 and the left handlebar 22 rotate with the central rod 21 as the axis. Accordingly, when the rider pushes the left handlebar 22, it can cooperate with the left pedal 121 to form a labor-saving action to drive the rear wheel 12. On the other hand, the right pedal 122 is linked to the right connecting rod 25, and the right connecting rod 25 and the right handlebar 23 are both set on the central rod 21, and the gear set 30 is used to form a linkage between the right handlebar 23 and the right connecting rod 25. The first bevel gear 31 and the second bevel gear 32 of the gear set 30 are both set on the central rod 21, and the first bevel gear 31 is fixed to the right handlebar 23, and the second bevel gear 32 is fixed to the right connecting rod 25. In addition, the connecting gear 33 is connected to the central rod 21 by the mounting rod 331, so that the connecting gear 33 is located between the first bevel gear 31 and the second bevel gear 32, and simultaneously engages the first bevel gear 31 and the second bevel gear 32. When the rider pushes and pulls the right handlebar 23, the first bevel gear 31 at the end of the right handlebar 23 drives the connecting gear 33, and the connecting gear 33 further drives the second bevel gear 32, which not only transmits the power but also creates the reverse rotation between the first bevel gear 31 and the second bevel gear 32. In this way, the rotating direction of the right handlebar 23 and the right connecting rod are reversed through the gear set 30. When the rider pushes the right handlebar 23, it can cooperate with the right pedal 122 to form a labor-saving action to drive the rear wheel 12. In summary, the present invention uses the gear set 30 to change the swing direction of the right handlebar 23, so that regardless of the alternating movement of the left pedal 121 or the right pedal 122, the left handlebar 22 and the right handlebar 23 will both push forward and pull back synchronously, which can produce a fitness effect like rowing a boat. When the left and right hands simultaneously push forward and pull backward, the rider will more easily control the left handlebar 22, the right handlebar 23, and the center of gravity of the body tilt to the side of the vehicle frame 10, thereby facilitating the operation of the walking vehicle thus to improve handling maneuverability and stability.

Figure 10:
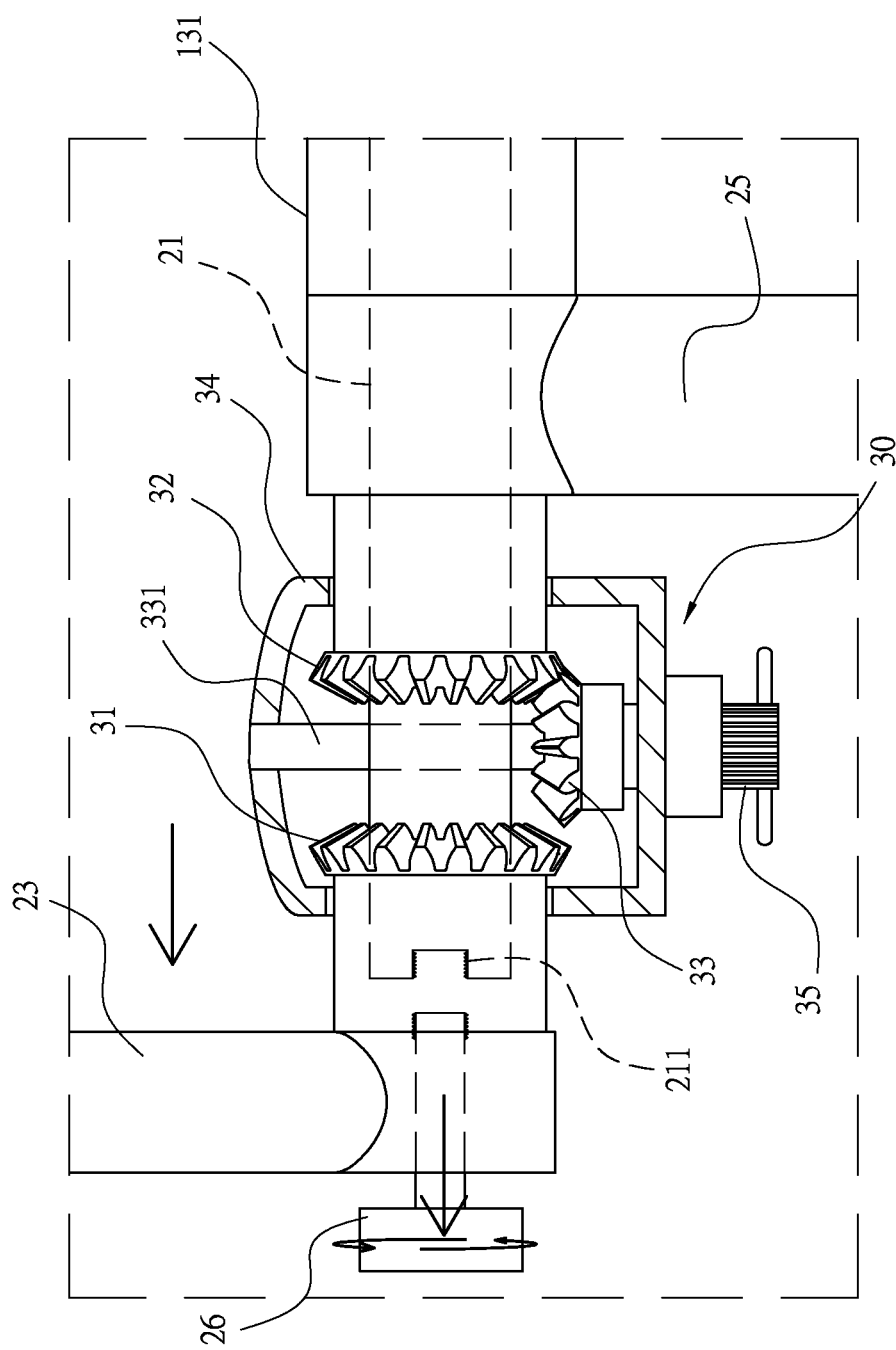
FIG. 10 is a schematic drawing of the present invention to adjust the position of the right handlebar.
Figure 11:
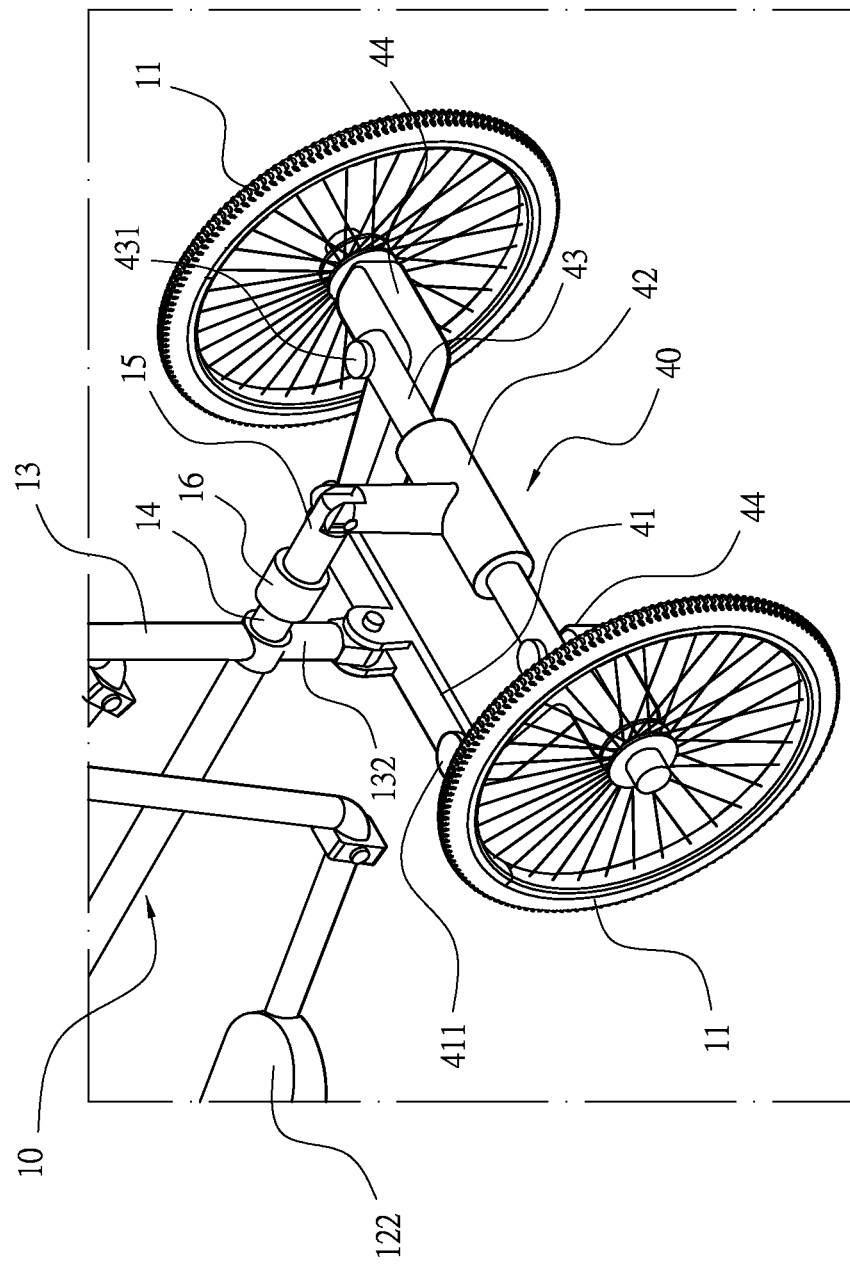
FIG. 11 is a schematic elevational view of the steering mechanism.
Figure 12:
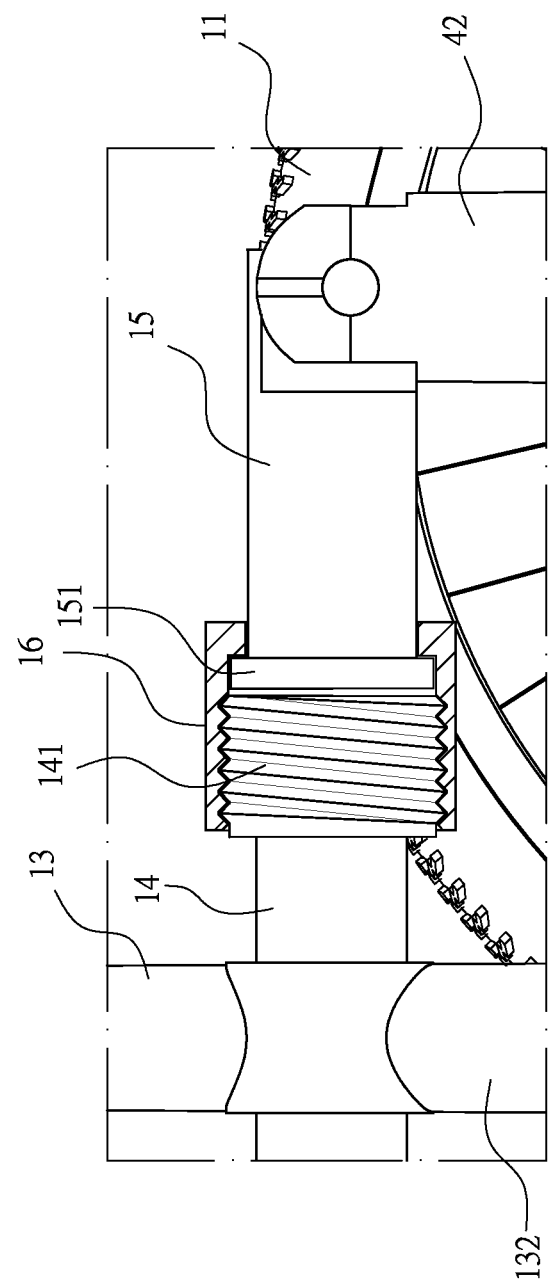
FIG. 12 is a schematic diagram of the connection between the vehicle frame and the steering mechanism of the present invention.
Figure 13:
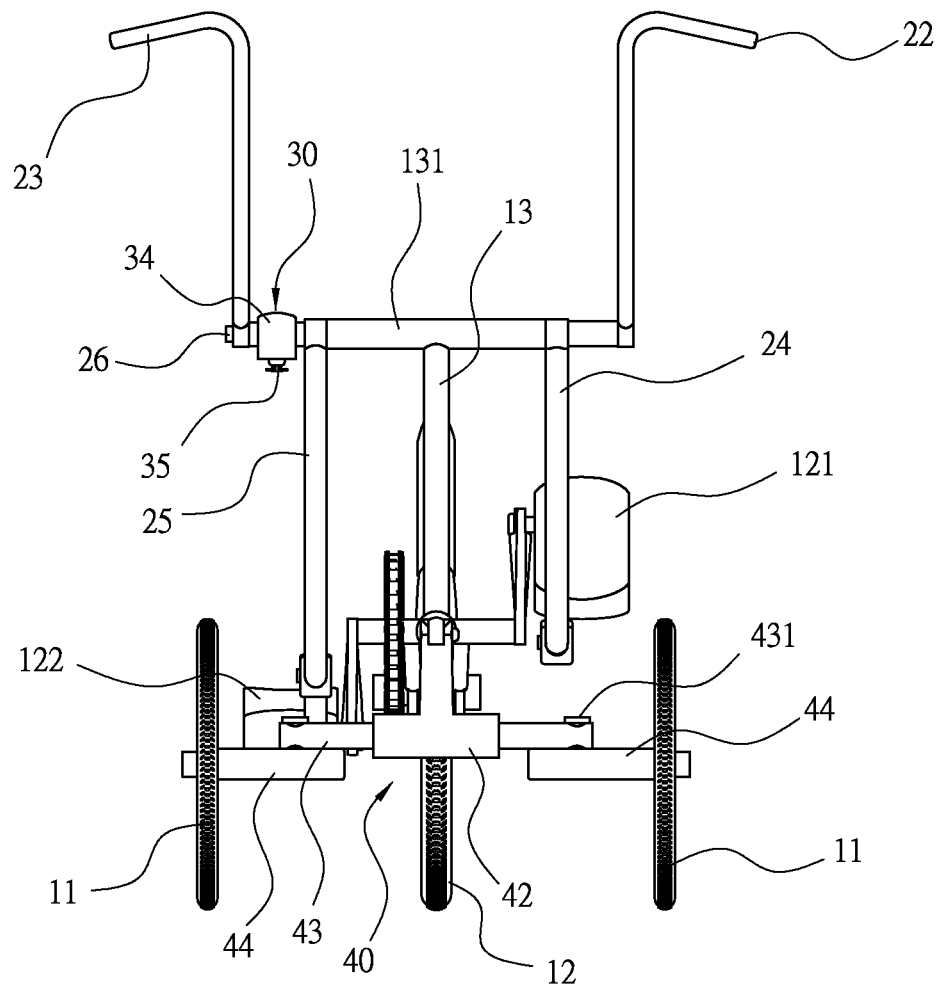
FIG. 13 is a front view of the present invention before the turning action.
Figure 14:
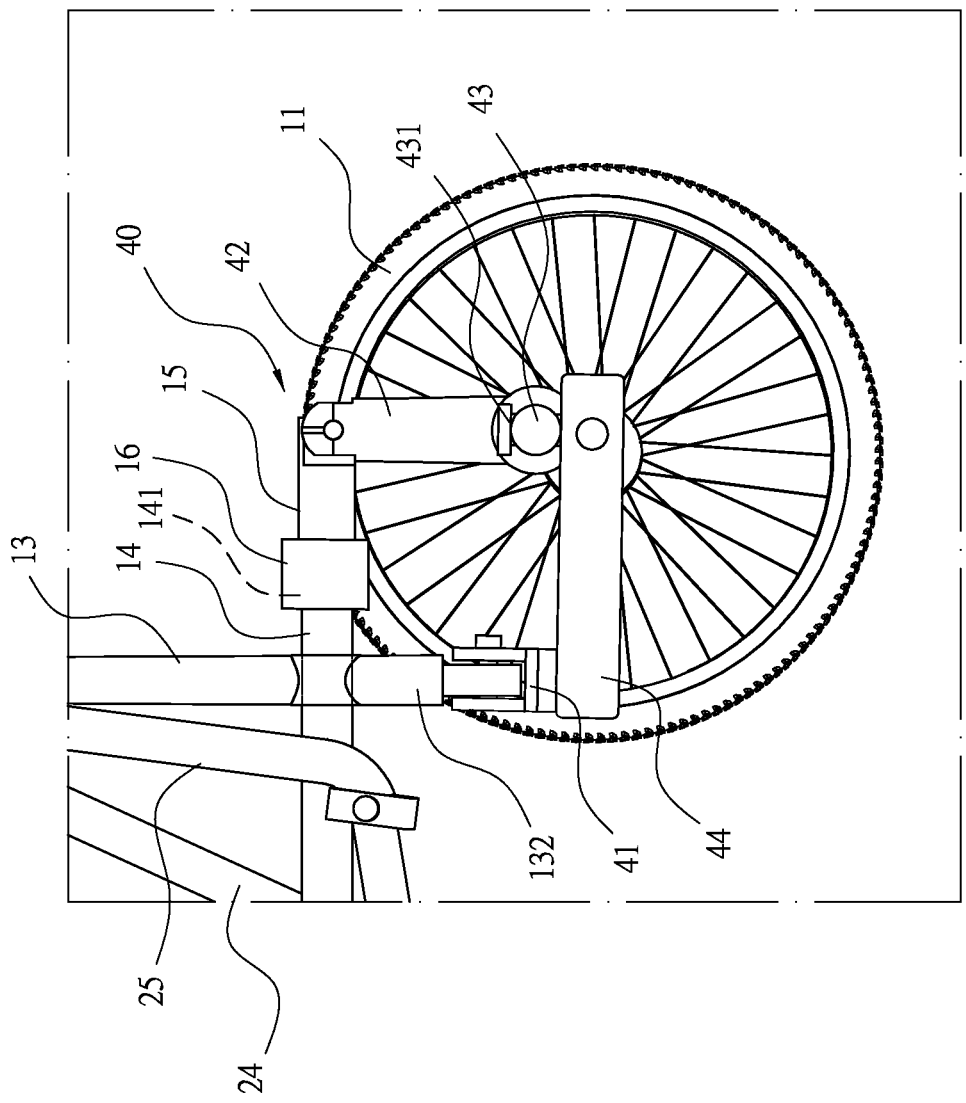
FIG. 14 is a schematic side view of the present invention before the turning action.
Figure 15:
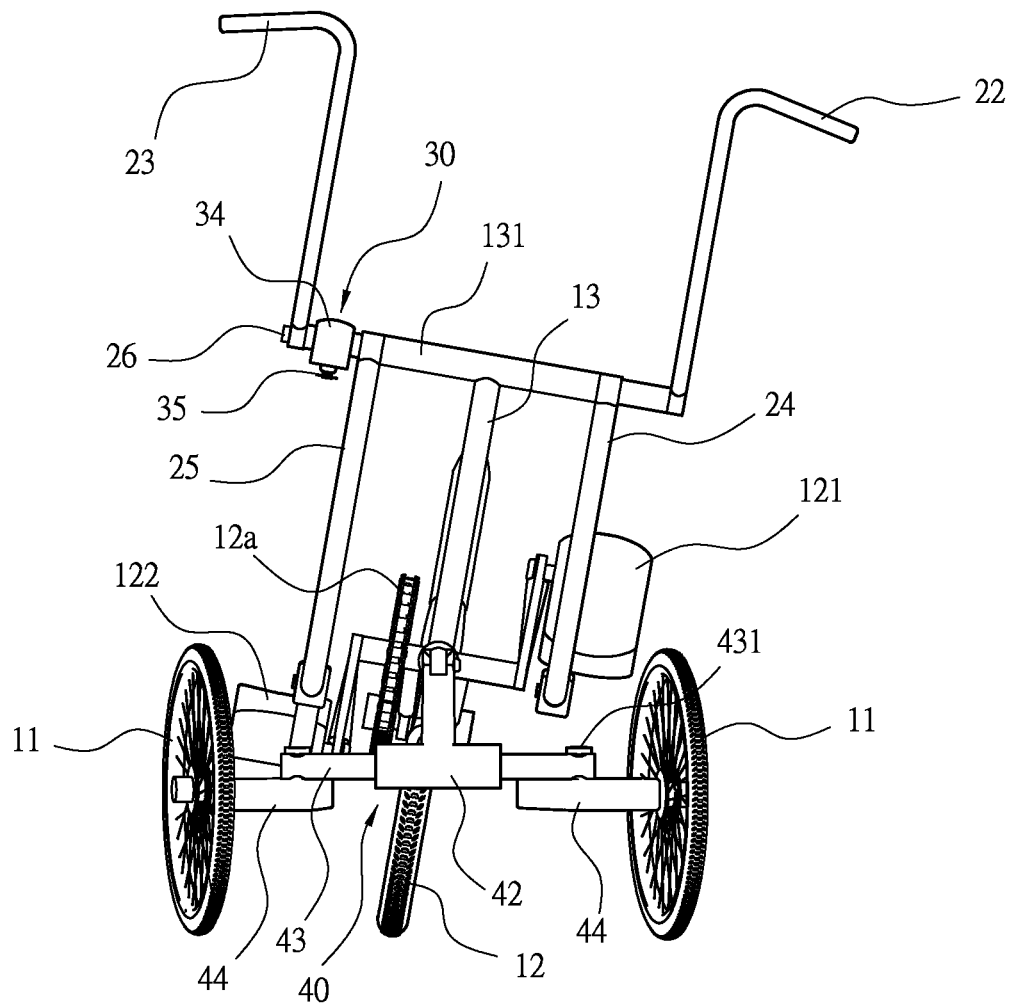
FIG. 15 is a front view of the present invention in the turning action.
Figure 16:
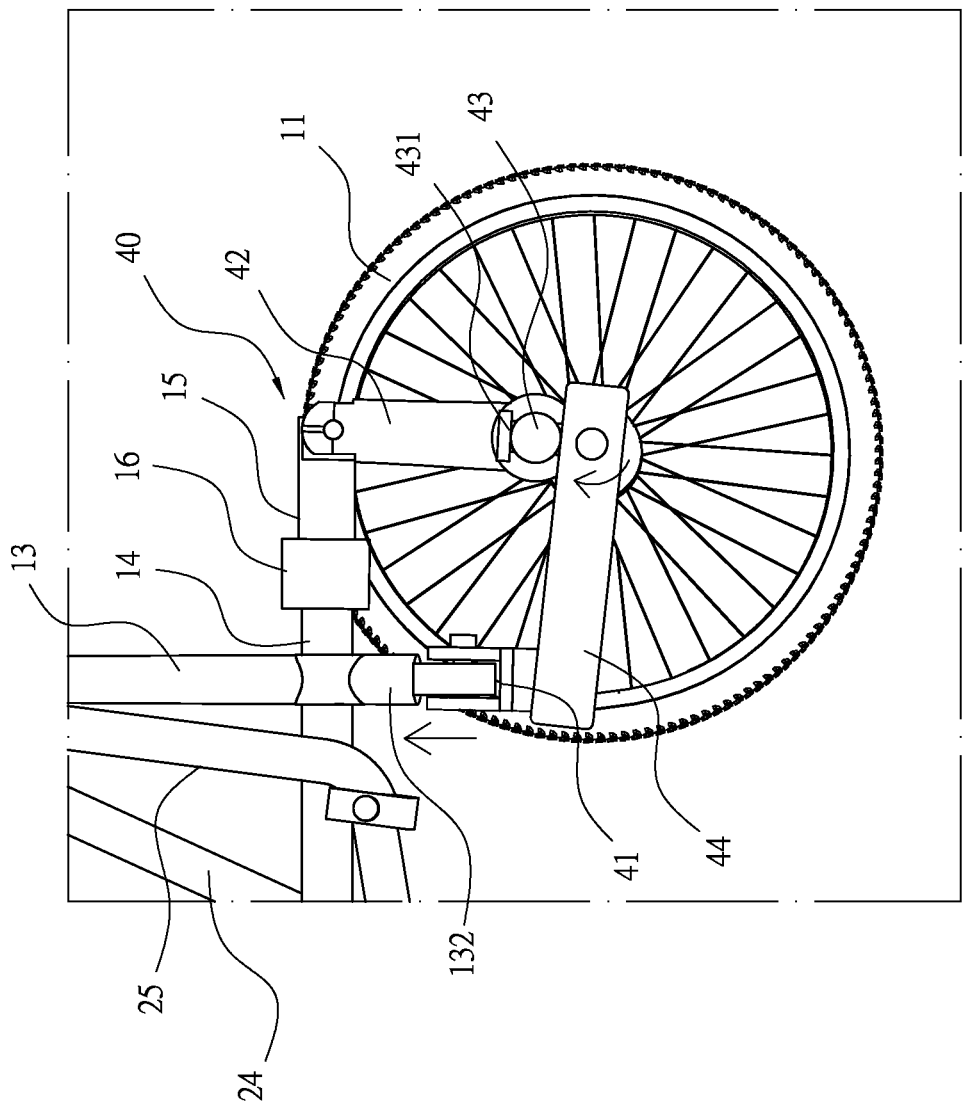
FIG. 16 is a schematic side view of the present invention in the turning action.
Figure 17:
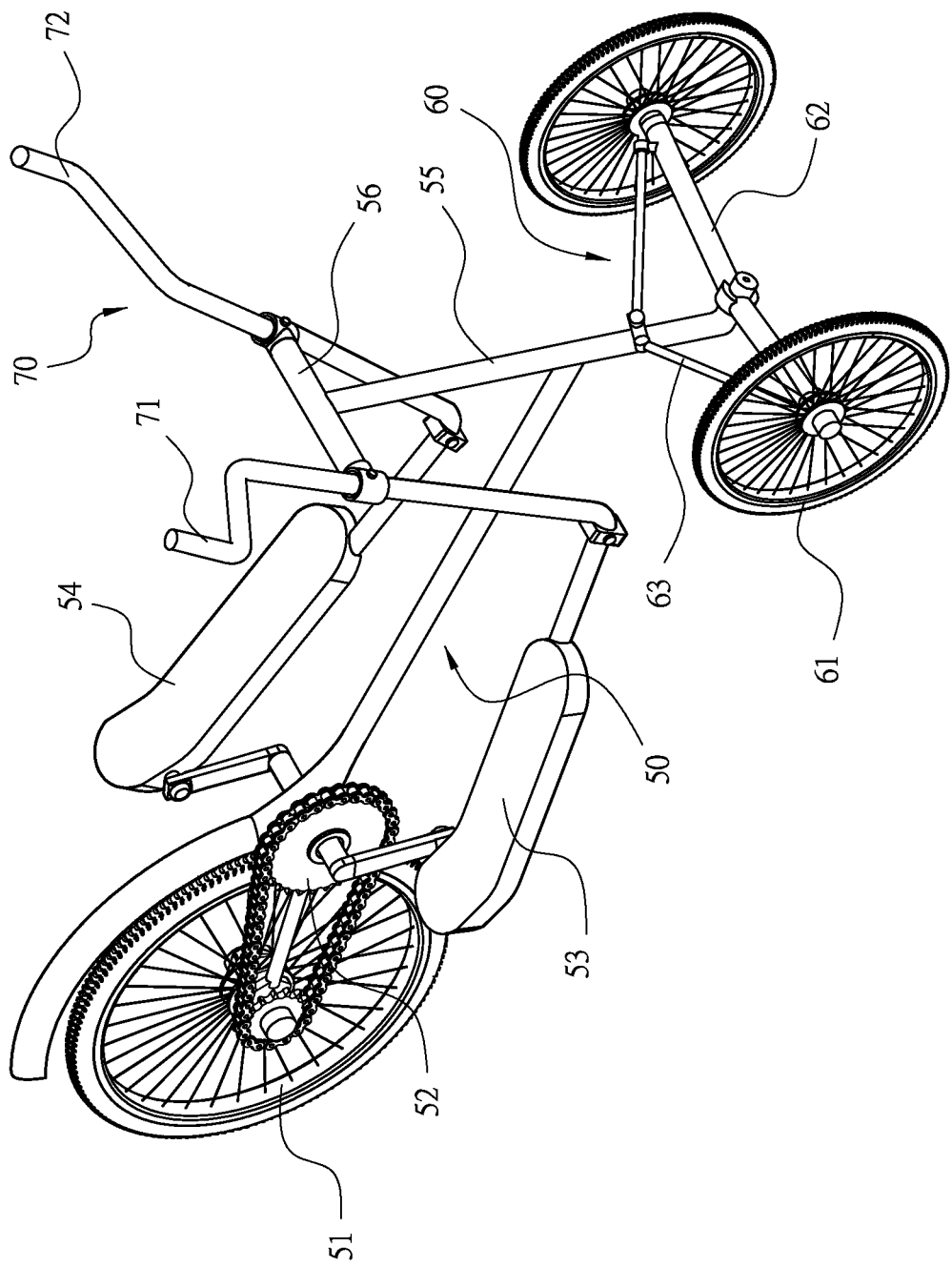
FIG. 17 is an elevational view of a walking vehicle according to the prior art.

For another actual use of the present invention, please refer to FIGS. 6-9. When the rider wants to stop synchronizing the left handlebar 22 and the right handlebar 23, the positioning screw 35 is locked and pressed down on the connecting gear 33, so that the central rod 21, the connecting gear 33, the first bevel gear 31 and the second bevel gear 32 form an overall interlocking piece. At this time, the connecting gear 33 cannot rotate, thereby forming direct transmission between the first bevel gear 31, the second bevel gear 32 and the connecting gear 33, that is, the central rod 21 and the right handlebar 23 will rotate synchronously. In this mode, the rotational direction of the right connecting rod 25 and the right handlebar 23 is the same, that is, the right connecting rod 25 and the right handlebar 23 are adjusted to be parallel to each other, and the left pedal 121 and the right pedal 122 are still alternately stepped on. At the same time, the left handlebar 22 and the right handlebar 23 will swing in opposite directions. In this way, the present invention provides another motion mode for driving the walking vehicle. In addition, as shown in FIG. 10, the central rod 21 is provided with a threaded hole 211 at the end of the right handlebar 23, and the threaded hole 211 is locked with a lock screw 26, and the lock screw 26 is constrained on the outside of the right handlebar 23. When switching between synchronous and non-synchronous operation modes as the left handlebar 22 and the right handlebar 23 are not symmetrical to each other, the left handlebar 22 and the right handlebar 23 will swing in the opposite direction at the normal position. At this time, the lock screw 26 located on the outside of the right handlebar 23 can be loosened, so that the right handlebar 23 can be appropriately pulled away from the central rod 21, thereby separating the first bevel gear 31 and the connecting gear 33, and the right handlebar 23 can be freely rotated and adjusted to the correct position. Then lock the lock screw 26 in order to engage the first bevel gear 31 with the connecting gear 33, thereby the relative positions of the left handlebar 22 and the right handlebar 23 can be effectively adjusted.

To further explain the steering action of the walking vehicle, please refer to FIGS. 11-16. The turning action of the steering mechanism 40 is initiated by tilting the vehicle thus to move the coupler 41 laterally, and as the coupler 41 moves laterally it will move up slightly and so the inner fixed rod 43 will respond with a small rotation. Furthermore, the inner fixed rod 43 has the two opposite ends with each connecting to the middle section of the steer arm 44 by the fixed pivot 431, and each of the steer arms 44 has one end connecting to the front wheel 11 and the opposite end connecting to the moving pivot 411, that is, the steering mechanism 40 uses the coupler 41, the steer arms 44, and the inner fixed rod 43 to form a four-bar linkage. In addition, the one end of the T-arm 42 of the steering mechanism 40 that extends outward is connected to the second rod 15, the flange 151 of the second rod 15 of the vehicle frame 10 is mounted inside the sleeve 16 and can prevent the sleeve 16 from being detached. Furthermore, the sleeve 16 is locked at the threaded portion 141 of the round rod 14, and the first rod 132 is jointed at the middle section of the coupler 41. When the rider controls the left handlebar 22, the right handlebar 23 and the center of gravity of the body to incline to one side of the vehicle frame 10, the vehicle frame 10 will be rotated at an appropriate angle with the round rod 14 as the axis, so that the vehicle frame 10, the left handlebar 22, the right handlebar 23, the left pedal 121, the right pedal 122, and the rear wheel 12 will tilt together. At the same time, the first rod 132 pushes the coupler 41 to move laterally, so that the coupler 41 pulls the steer arm 44 at one end and pushes the other steer arm 44 at the other end. In this way, the steer arms 44 can change the steering angles of the front wheels 11 to achieve the purpose of turning the walking vehicle. Furthermore, since the length of the first rod 132 remains unchanged, when the first rod 132 rotates with the round rod 14 as the axis, the coupler 41 will rise slightly. Cooperating with a small rotation of the inner fixed rod 43 through the T-arm 42, it allows the coupler 41 to lift with a small motion responding to the tilting angle provided by the rider during steering, so as to effectively achieve the turning operation of the walking vehicle.

What is claimed is:

1. A walking vehicle, comprising:
a vehicle frame provided with two front wheels and one rear wheel, said rear wheel is connected to a left pedal and a right pedal, said vehicle frame comprises a vertical tube adjacent to said two front wheels and a lateral tube at the top end of said vertical tube;
a handlebar set comprises a central rod, a left handlebar, a right handlebar, a left connecting rod, and a right connecting rod, said central rod passes through said lateral tube, said left handlebar sheathes one end of said central rod, said right handlebar sheathes the other end of said central rod, said left handlebar and said left pedal are connected to said left connecting rod, said right handlebar and said right pedal are connected to said right connecting rod; and
a gear set comprises a first bevel gear mounted at said right handlebar, a second bevel gear mounted at said right connecting rod and a connecting gear with a mounting rod passing through said central rod thereof and engaging said first bevel gear and said second bevel gear.

2. The walking vehicle as claimed in claim 1, wherein said gear set further comprises a gear box fixed to said mounting rod to enclose said first bevel gear, said second bevel gear and said connecting gear, and a positioning screw provided on said gear box, said positioning screw is locked and pressed down on said connecting gear, so that said central rod, said connecting gear, said first bevel gear and said second bevel gear form an overall interlocking piece.

3. The walking vehicle as claimed in claim 1, wherein said central rod is provided with a threaded hole at the end of said right handlebar, said threaded hole is locked with a lock screw, said lock screw is constrained on the outside of said right handlebar.

4. The walking vehicle as claimed in claim 1, wherein said vehicle frame further comprises a first rod coaxially extended at a bottom end of said vertical tube and used to control said front wheels for steering, a round rod extending perpendicular to said first rod, and a second rod coaxially connected with said round rod and used to hold said two front wheels.

5. The walking vehicle as claimed in claim 4, wherein said second rod comprises a flange; said round rod comprises a threaded portion; said vehicle frame further comprises a sleeve sheathing on said second rod and constrained by said flange to prevent said sleeve detaching from said second rod, said sleeve is threaded onto said threaded portion of said round rod so that said round rod can rotate relatively to said second rod.

6. The walking vehicle as claimed in claim 5, further comprising a steering mechanism, said steering mechanism comprising a coupler, a T-arm, an inner fixed rod and two steer arms, said coupler has a middle joint connected to said first rod and two opposite ends each provided with a moving pivot, The middle joint of said T-arm connects to said second rod, and its tube severs as a sleeve for said inner fixed rod, said inner fixed rod and said coupler are parallel to each other, said two steer arms each has one end connects to said one front wheel and the opposite end connected to said one moving pivot, said inner fixed rod has two opposite ends with each connecting to respective middle section of said steer arm by a fixed pivot.

\* \* \* \* \*